(12) United States Patent
Hua et al.

(10) Patent No.: US 12,275,135 B2
(45) Date of Patent: Apr. 15, 2025

(54) HUMANOID FINGER MECHANISM

(71) Applicant: CHANGZHOU INSTITUTE OF TECHNOLOGY, Changzhou (CN)

(72) Inventors: Hongliang Hua, Changzhou (CN);
Shihong Wu, Changzhou (CN);
Xiaofeng Wu, Changzhou (CN);
Yongjiang Chen, Changzhou (CN);
Xiaojun Wang, Changzhou (CN);
Cheng Huang, Changzhou (CN)

(73) Assignee: CHANGZHOU INSTITUTE OF TECHNOLOGY, Changzhou (CN)

( * ) Notice: Subject to any disclaimer, the term of this patent is extended or adjusted under 35 U.S.C. 154(b) by 23 days.

(21) Appl. No.: 17/781,009

(22) PCT Filed: Nov. 29, 2021

(86) PCT No.: PCT/CN2021/133960
§ 371 (c)(1),
(2) Date: Oct. 27, 2022

(87) PCT Pub. No.: WO2022/222476
PCT Pub. Date: Oct. 27, 2022

(65) Prior Publication Data
US 2024/0157575 A1    May 16, 2024

(30) Foreign Application Priority Data

Apr. 22, 2021 (CN) .......................... 202110435068.2

(51) Int. Cl.
*B25J 15/00* (2006.01)
*B25J 15/02* (2006.01)

(52) U.S. Cl.
CPC ....... *B25J 15/0009* (2013.01); *B25J 15/0233* (2013.01)

(58) Field of Classification Search
CPC .... B25J 15/0009; B25J 15/0233; B25J 15/10; B25J 15/12
(Continued)

(56) References Cited

U.S. PATENT DOCUMENTS 4,955,918 A * 9/1990 Lee .......................... A61F 2/583
294/111
5,200,679 A * 4/1993 Graham ............... B25J 15/0009
294/111

(Continued)

FOREIGN PATENT DOCUMENTS

CN    106037999 A    10/2016
CN    108000541 A    5/2018

(Continued)

*Primary Examiner* — Paul T Chin
(74) *Attorney, Agent, or Firm* — Bayramoglu Law Offices LLC

(57) ABSTRACT

A humanoid finger mechanism includes: a finger seat; at least one proximal knuckle, located at an outer side of the finger seat; at least one middle knuckle, located at an outer side of the at least one proximal knuckle; a distal knuckle, located at an outer side of the at least one middle knuckle; a driver, located at an inner side of the finger seat; a driving cable, wherein a first end of the driving cable is connected with the driver, while a second end of the driving cable is connected with the distal knuckle after sequentially penetrating through the finger seat, the at least one proximal knuckle and the at least one middle knuckle; and a tension band, a first end of the tension band is connected with the finger seat, while a second end of the tension band is connected with the distal knuckle.

20 Claims, 1 Drawing Sheet

(58) Field of Classification Search
USPC .................................................. 294/111, 106
See application file for complete search history.

(56) References Cited

U.S. PATENT DOCUMENTS

| | | | | |
|---|---|---|---|---|
| 5,447,403 | A * | 9/1995 | Engler, Jr. | ............ B25J 15/0009 |
| | | | | 294/111 |
| 5,647,723 | A * | 7/1997 | Rush | ..................... B25J 15/0009 |
| | | | | 901/29 |
| 8,483,880 | B2 * | 7/2013 | de la Rosa Tames | ........................ |
| | | | | B25J 15/0009 |
| | | | | 600/595 |
| 8,827,337 | B2 * | 9/2014 | Murata | ................. B25J 15/0009 |
| | | | | 294/111 |
| 9,545,727 | B1 * | 1/2017 | Shamlian | ................ B25J 9/1045 |
| 10,821,601 | B2 * | 11/2020 | Baldoni | ................ A61H 1/0274 |
| 11,685,057 | B2 * | 6/2023 | Kim | ........................ B25J 9/1045 |
| | | | | 294/213 |
| 12,090,636 | B2 * | 9/2024 | Seki | ........................ B25J 9/1075 |

FOREIGN PATENT DOCUMENTS

| | | |
|---|---|---|
| CN | 109822605 A | 5/2019 |
| CN | 208808757 U | 5/2019 |
| CN | 113084851 A | 7/2021 |
| FR | 2665833 A1 | 2/1992 |

* cited by examiner

HUMANOID FINGER MECHANISM

CROSS REFERENCE TO THE RELATED APPLICATIONS

This application is the national stage entry of International Application No. PCT/CN2021/133960, filed on Nov. 29, 2021, which is based upon and claims priority to Chinese Patent Application No. 202110435068.2, filed on Apr. 22, 2021, the entire contents of which are incorporated herein by reference.

TECHNICAL FIELD

The present invention relates to the technical field of robots, and particularly to a humanoid finger mechanism.

BACKGROUND

As a key component, for implementing a grabbing operation, of a robot, a humanoid finger mechanism has broad application prospect in the fields of medical treatment, agriculture, new retailing, etc.

A humanoid finger in an existing grabbing mechanism of a robot is relatively complex in structure and high in manufacturing cost, and includes a plenty of components.

SUMMARY

The problem to be solved by the present invention is that a present humanoid finger mechanism is complex in structure.

In order to solve the foregoing problem, the present invention provides a humanoid finger mechanism, which includes:
  a finger seat;
  at least one proximal knuckle, located at an outer side of the finger seat;
  at least one middle knuckle, located at an outer side of the proximal knuckle;
  a distal knuckle, located at an outer side of the middle knuckle,
  each of the finger seat, the proximal knuckle, the middle knuckle and the distal knuckle being of an integrated structure, and the finger seat, the proximal knuckle, the middle knuckle and the distal knuckle being sequentially hinged;
  a driver, located at an inner side of the finger seat;
  a driving cable, one end being connected with the driver, while the other end being connected with the distal knuckle after sequentially penetrating through the finger seat, the proximal knuckle and the middle knuckle; and
  a tension band, one end being connected with the finger seat, while the other end being connected with the distal knuckle after sequentially penetrating through the finger seat, the proximal knuckle and the middle knuckle.

Optionally, hinge relief grooves are formed at hinging positions between the finger seat, the proximal knuckle, the middle knuckle and the distal knuckle.

Optionally, the distal knuckle includes a fourth transverse plate and a sixth connecting portion connected with the fourth transverse plate. The sixth connecting portion includes a sixth vertical plate in vertical connection with the fourth transverse plate and a sixth connecting plate in vertical connection with the sixth vertical plate. The sixth connecting plate extends from a top end of the sixth vertical plate to a side away from the fourth transverse plate. A sixth hinging hole adapted to the middle knuckle is formed in the sixth connecting plate. A second tension hole is formed in an end of the sixth connecting plate close to the fourth transverse plate. A fixing dowel is arranged at an end of the sixth vertical plate close to the fourth transverse plate. The driving cable is connected with the fixing dowel.

Optionally, the middle knuckle includes a third transverse plate located in middle, as well as a fourth connecting portion and fifth connecting portion located at two ends of the third transverse plate respectively. The middle knuckle is hinged with the proximal knuckle through the fourth connecting portion. The fifth connecting portion is suitable for being matched with the sixth hinging hole so as to hinge the middle knuckle and the distal knuckle.

Optionally, the fifth connecting portion includes a fifth vertical plate in vertical connection with the third transverse plate and a fifth connecting plate in vertical connection with the fifth vertical plate. The fifth connecting plate extends from a top end of the fifth vertical plate to a direction away from the third transverse plate. A fifth hinging hole adapted to the sixth hinging hole is formed in the fifth connecting plate. A fifth through hole is formed in an end of the fifth vertical plate close to the third transverse plate.

Optionally, the fourth connecting portion includes a fourth vertical plate in vertical connection with the third transverse plate and a fourth connecting plate in vertical connection with the fourth vertical plate. The fourth connecting plate extends from a top end of the fourth vertical plate to a direction away from the third transverse plate. A fourth hinging hole is formed in the fourth connecting plate. The middle knuckle is hinged with the proximal knuckle through the fourth hinging hole. A fourth through hole is formed in an end of the fourth vertical plate close to the third transverse plate.

Optionally, the proximal knuckle includes a second transverse plate located in middle, as well as a second connecting portion and third connecting portion located at two ends of the second transverse plate respectively. The third connecting portion is suitable for being hinged with the fourth connecting portion. The proximal knuckle is hinged with the finger seat through the second connecting portion. A structure of the second connecting portion is the same as that of the fourth connecting portion. A structure of the third connecting portion is the same as that of the fifth connecting portion.

Optionally, the finger seat includes a first transverse plate and a first connecting portion connected to an outer side of the first transverse plate. The first connecting portion includes a first vertical plate in vertical connection with the first transverse plate and a first connecting plate in vertical connection with the first vertical plate. The first connecting plate extends from a top end of the first vertical plate to a direction away from the first transverse plate. A first hinging hole is formed in an end of the first connecting plate away from the first transverse plate. The first hinging hole is suitable for being matched with the second connecting portion so as to hinge the finger seat and the proximal knuckle. A first tension hole is formed in an end of the first connecting plate close to the first transverse plate. A first through hole is formed in an end of the first vertical plate close to the first transverse plate.

Optionally, finger pulp skin is further included. The finger pulp skin is sequentially connected with the finger seat, the proximal knuckle, the middle knuckle and the distal knuckle.

Optionally, the driver is a tandem elastic driver.

Compared with a conventional art, the humanoid finger mechanism provided in the present invention has the following advantages.

According to the humanoid finger mechanism provided in the present invention, each of the sequentially hinged finger seat, proximal knuckle, middle knuckle and distal knuckle is arranged into an integrated structure, so that the number of components is reduced. In addition, the tension band and driving cable of an integrated structure are combined, so that a grabbing control process of the humanoid finger mechanism is simplified, and the simplification of a structure of the humanoid finger mechanism and the reduction of the manufacturing cost are facilitated.

DESCRIPTIONS ABOUT THE REFERENCE SIGNS

Figure 1:
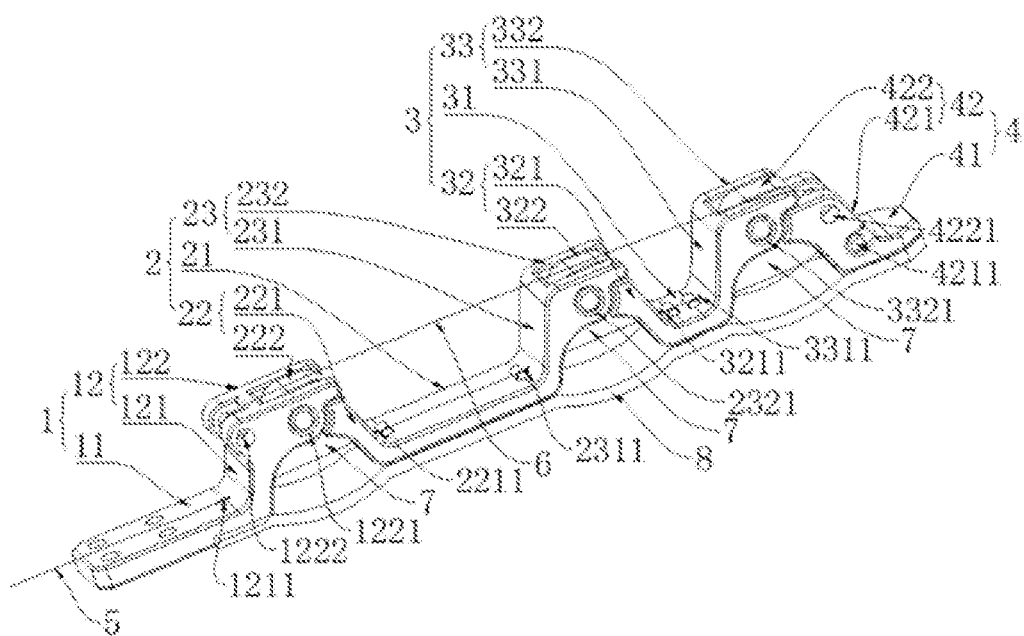
FIG. 1 is a simplified structure diagram of a humanoid finger mechanism according to the present invention.

1—finger seat; 11—first transverse plate; 12—first connecting portion; 121—first vertical plate; 1211—first through hole; 122—first connecting plate; 1221—first hinging hole; 1222—first tension hole; 2—proximal knuckle; 21—second transverse plate; 22—second connecting portion; 221—second vertical plate; 2211—second through hole; 222—second connecting plate; 23—third connecting portion; 231—third vertical plate; 2311—third through hole; 232—third connecting plate; 2321—third hinging hole; 3—middle knuckle; 31—third transverse plate; 32—fourth connecting portion; 321—fourth vertical plate; 3211—fourth through hole; 322—fourth connecting plate; 33—fifth connecting portion; 331—fifth vertical plate; 3311—fifth through hole; 332—fifth connecting plate; 3321—fifth hinging hole; 4—distal knuckle; 41—fourth transverse plate; 42—sixth connecting portion; 421—sixth vertical plate; 4211—fixing dowel; 422—sixth connecting plate; 4221—second tension hole; 5—driving cable; 6—tension band; 7—hinge relief groove; and 8—finger pulp skin.

DETAILED DESCRIPTION OF THE EMBODIMENTS

Embodiments of the present invention will be described below in detail. Examples of the embodiments are illustrated in the drawings, where the same or similar reference signs always represent the same or similar components or components with the same or similar functions. The following embodiments described with reference to the drawings are exemplary and intended to explain the present invention, and cannot be understood as limits to the present invention. All other embodiments obtained by those of ordinary skill in the art based on the embodiments of the present invention without creative efforts shall fall within the scope of protection of the present invention.

In the descriptions of the present invention, it is to be understood that orientation or position relationships indicated by terms "center", "longitudinal", "transverse", "length", "width", "thickness", "upper", "lower", "front", "back", "left", "right", "vertical", "horizontal", "top", "bottom", "inner", "outer", "clockwise", "counterclockwise", "axial", "circumferential", "radial", etc., are orientation or position relationships shown in the drawings, are used not to indicate or imply that indicated devices or components must be in specific orientations or structured and operated in specific orientations but only to simplify descriptions, and thus should not be understood as limits to the present invention.

In addition, terms "first" and "second" are only for simplifying descriptions and should not be understood to indicate or imply relative importance or implicitly indicate the number of indicated technical features. Therefore, a feature defined by "first" and "second" may explicitly or implicitly indicate the inclusion of one or more such features. In the descriptions of the present invention, "multiple" means two or more, unless otherwise limited definitely and specifically.

In the present invention, unless otherwise expressly stated and defined, the state that a first feature is "above" or "below" a second feature may include that the first feature directly contacts with the second feature, or may include that the first feature does not with the second feature directly but through another feature therebetween. Moreover, the state that the first feature is "above", "over" and "on" the second feature may include that the first feature is over and above the second feature, or only represents that a horizontal height of the first feature is greater than that of the second feature. The state that the first feature is "below", "under" and "underneath" the second feature may include that the first feature is under and below the second feature, or only represents that the horizontal height of the first feature is less than that of the second feature.

In order to make the objectives, features and advantages of the present invention clearer and easier to understand, specific embodiments of the present invention will be described below in detail in combination with the drawings.

A humanoid finger mechanism is a basic component in a grabbing mechanism of a robot. A present humanoid finger mechanism in a robot usually grabs an object under the co-action of multiple components. As a result, the humanoid finger mechanism is complex in structure and relatively high in manufacturing cost, and restricts the extensive application of robots.

In order to solve the problem of complex structure of a present humanoid finger mechanism, the present invention provides a humanoid finger mechanism. As shown in FIG. 1, the humanoid finger mechanism includes: a finger seat 1; at least one proximal knuckle 2, located at an outer side of the finger seat 1; at least one middle knuckle 3, located at an outer side of the proximal knuckle 2; a distal knuckle 4, located at an outer side of the middle knuckle 3, each of the finger seat 1, the proximal knuckle 2, the middle knuckle 3 and the distal knuckle 4 being of an integrated structure, and the finger seat 1, the proximal knuckle 2, the middle knuckle 3 and the distal knuckle 4 being sequentially hinged; a driver (not shown in the figure), located at an inner side of the finger seat 1; a driving cable 5, one end being connected with the driver, while the other end being connected with the distal knuckle 4 after sequentially penetrating through the finger seat 1, the proximal knuckle 2 and the middle knuckle 3, such that the driver drives the sequentially mutually hinged finger seat 1, proximal knuckle 2, middle knuckle 3 and distal knuckle 4 through the driving cable 5 to rotate relatively at hinge points to further implement grabbing; and a tension band 6, one end being connected with the finger seat 1, while the other end being connected with the distal knuckle 4 after sequentially penetrating through the finger seat 1, the proximal knuckle 2 and the middle knuckle 3, such that the humanoid finger mechanism may conveniently reset through the tension band 6 after completing grabbing.

In the present application, the outer side refers to a side close to the distal knuckle 4 in the humanoid finger mechanism. The inner side specifically refers to a side away from the distal knuckle 4 in the humanoid finger mechanism.

In order to simplify a structure of the humanoid finger mechanism, a tension component of the humanoid finger mechanism in the present application is preferably a tension band 6 of an integrated structure. When the humanoid finger mechanism is in an initial state, the sequentially connected finger seat 1, proximal knuckle 2, middle knuckle 3 and distal knuckle 4 are in an extending state under a tension of the tension band 6. When an object needs to be grabbed, the driving cable 5 is pulled by the driver. Since the driving cable 5 is connected with the distal knuckle 4 at the outermost side, and the distal knuckle 4 is hinged with the middle knuckle 3, the distal knuckle 4 overcomes the tension of the tension band 6 under a tensile force of the driving cable 5 to rotate at first relative to the middle knuckle 3 at the hinge point and then bend. Meanwhile, since the driving cable 5 penetrates through the middle knuckle 3, the proximal knuckle 2 and the finger seat 1, and the middle seat 3, the proximal knuckle 2 and the finger seat 1 are hinged with one another, the middle knuckle 3 and the proximal knuckle 2 sequentially overcome the tension of the tension band 6 to bend with the increase of the tensile force of the driving cable 5, until the target object is grabbed.

When the object needs to be released after grabbed, the driver does not pull the driving cable 5 any longer, and the distal knuckle 4, the middle knuckle 3, the proximal knuckle 2 and the finger seat 1 sequentially extend to an initial state under the tension of the tension band 6, so as to complete a grabbing action.

According to the humanoid finger mechanism provided in the present invention, each of the sequentially hinged finger seat 1, proximal knuckle 2, middle knuckle 3 and distal knuckle 4 is arranged into an integrated structure, so that the number of components is reduced. In addition, the tension band 6 and driving cable 5 of an integrated structure are combined, so that a grabbing control process of the humanoid finger mechanism is simplified, and the simplification of a structure of the humanoid finger mechanism and the reduction of the manufacturing cost are facilitated.

In addition, with the extensive application of robots, the number of types of objects grabbed by robots has increased. A humanoid finger in a present grabbing mechanism of a robot is usually of a fixed structure. As a result, a grabbing mechanism of each robot may usually grab a product of a fixed type or a product whose size is in a specific range, and the humanoid finger mechanism is relatively poor in universality.

In order to achieve the universality of the humanoid finger mechanism, in the present application, each of the finger seat 1, the proximal knuckle 2, the middle knuckle 3 and the distal knuckle 4 is further preferably of an integrated modular structure. That is, connecting parts between the proximal knuckle 2, the middle knuckle 3 and the distal knuckle 4 are the same in structure. Therefore, the number of each knuckle in the humanoid finger mechanism may be adjusted according to a grabbing need to further control a length of the humanoid finger mechanism. As such, the adjusted length of the humanoid finger mechanism is adapted to an object to be grabbed, and the universality is improved.

In order to ensure a grabbing effect, in the present application, hinge relief grooves 7 are preferably formed at hinging positions between the finger seat 1, the proximal knuckle 2, the middle knuckle 3 and the distal knuckle 4. Specifically, the hinge relief grooves 7 are located at a side where the humanoid finger mechanism grabs an object. During grabbing, two adjacent hinged knuckles rotate relatively at a hinge point, and the two knuckles enter the hinge relief groove 7 through the hinge relief groove 7 arranged at the hinge point after rotating. As such, the two hinged knuckles smoothly rotate relatively on one hand, and on the other hand, a rotation angle between the two knuckles is limited through the hinge relief groove 7.

The distal knuckle 4 is located at an outermost side of the humanoid finger mechanism. The distal knuckle 4 includes a fourth transverse plate 41 and a sixth connecting portion 42 connected with the fourth transverse plate 41. The fourth transverse plate 41 is configured to contact with a grabbed object during grabbing. A size of the fourth transverse plate 41 may be determined according to that of the grabbed object. The sixth connecting portion 42 is located at an inner side of the fourth transverse plate 41, i.e., an end close to the middle knuckle 3. The distal knuckle 4 is connected with the middle knuckle 3 through the sixth connecting portion 42. The sixth connecting portion 42 includes a sixth vertical plate 421 in vertical connection with the fourth transverse plate 41 and a sixth connecting plate 422 in vertical connection with the sixth vertical plate 421. It is to be noted that the vertical connection in the present application is only for describing that an included angle between distribution directions of two connected components is approximately 90° and is not limited to that the included angle includes 90° only. The sixth connecting plate 422 extends from a top end of the sixth vertical plate 421 to a side away from the fourth transverse plate 41 such that the fourth transverse plate 41 and the sixth connecting plate 422 are located at two ends of the sixth vertical plate 421 respectively. An extending direction of the fourth transverse plate 41 is opposite to that of the sixth connecting plate 422. The fourth transverse plate 41, the sixth vertical plate 421 and the sixth connecting plate 422 form a zigzag-like structure. In addition, the sixth connecting plate 422, the sixth vertical plate 421 and the adjacent middle knuckle 3 enclose a hinge relief groove 7. A sixth hinging hole adapted to the middle knuckle 3 is formed in the sixth connecting plate 422. In the present application, the sixth hinging hole is preferably distributed in a horizontal direction. A corresponding pin shaft penetrates through the sixth hinging hole such that the distal knuckle 4 and the middle knuckle 3 may rotate relatively about the pin shaft on a vertical plane. A second tension hole 4221 is formed in an end of the sixth connecting plate 422 close to the fourth transverse plate 41. The tension band 6 is connected with the sixth connecting plate 422 through the second tension hole 4221. A fixing dowel 4211 is arranged at an end of the sixth vertical plate 421 close to the fourth transverse plate 41. The driving cable 5 is connected with the fixing dowel 4211.

The sixth connecting plate 422 and the fourth transverse plate 41 are located at the two ends of the sixth vertical plate 421 respectively. Therefore, in the present application, the tension band 6 and the driving cable 5 are located at the two ends of the sixth vertical plate 421 respectively, and the driving cable 5 is located at an end of the fourth transverse plate 41 and penetrates through the hinge relief groove 7 between the distal knuckle 4 and the middle knuckle 3. In the initial state, under the action of the tension band 6, the distal knuckle 4 and the middle knuckle 3 are in a straight state but in a separated state at the hinge relief groove 7. During a grabbing action, under the action of the driver, the driving cable 5 overcomes the tension applied by the tension band 6 and applies a tensile force to the sixth vertical plate 421 for moving to a direction approaching the middle knuckle 3.

Since the driving cable 5 is connected with the end of the sixth vertical plate 421 close to the fourth transverse plate 41, and the distal knuckle 4 is hinged with the middle knuckle 3 through the sixth connecting plate 422 at the end away from the fourth transverse plate 41, the sixth vertical plate 421 rotates and bends to the direction approaching the middle knuckle 3 under the tensile force of the driving cable 5, and then the distal knuckle 4 and the middle knuckle 3 are folded at the hinge relief groove 7 therebetween for grabbing. After grabbing, the driver does not apply any tensile force to the driving cable 5 any longer, and under the action of the tension band 6, the distal knuckle 4 and the middle knuckle 3 rotate at the hinge point and are separated at the hinge relief groove 7, to recover the initial state.

The middle knuckle 3 is adjacent to the distal knuckle 4 and located at an inner side of the distal knuckle 4. The middle knuckle 3 includes a third transverse plate 31 located in middle, as well as a fourth connecting portion 32 and fifth connecting portion 33 located at two ends of the third transverse plate 31 respectively. The third transverse plate 31 is configured to contact with the grabbed object during grabbing. A length of the third transverse plate 31 is determined as needed. In order to ensure the grabbing effect, in the present application, bottom surfaces, i.e., surface in contact with the grabbed object, of the third transverse plate 31 and the fourth transverse plate 41 are preferably in an aligned state in the initial state. The fourth connecting portion 32 is adjacent to the proximal knuckle 2. The middle knuckle 3 is hinged with the proximal knuckle 2 through the fourth connecting portion 32. The fifth connecting portion 33 is suitable for being matched with the sixth hinging hole so as to hinge the middle knuckle 3 and the distal knuckle 4.

The fifth connecting portion 33 includes a fifth vertical plate 331 in vertical connection with the third transverse plate 31 and a fifth connecting plate 332 in vertical connection with the fifth vertical plate 331. An extending direction of the fifth vertical plate 331 is the same as that of the sixth vertical plate 421. The fifth connecting plate 332 extends from a top end of the fifth vertical plate 331 to a direction away from the third transverse plate 31. The fifth vertical plate 331, the fifth connecting plate 332, the sixth vertical plate 421 and the sixth connecting plate 422 enclose a hinge relief groove 7. A fifth hinging hole 3321 adapted to the sixth hinging hole is formed in the fifth connecting plate 332. A pin shaft sequentially penetrates through the fifth hinging hole 3321 and the sixth hinging hole so as to hinge the middle knuckle 3 and the distal knuckle 4. A fifth through hole 3311 is formed in an end of the fifth vertical plate 331 close to the third transverse plate 31 so as to connect the driving cable 5 and the distal knuckle 4 through the fifth through hole 3311.

The fourth connecting portion 32 includes a fourth vertical plate 321 in vertical connection with the third transverse plate 31 and a fourth connecting plate 322 in vertical connection with the fourth vertical plate 321. An extending direction of the fourth vertical plate 321 is the same as that of the fifth vertical plate 331. The fourth connecting plate 322 extends from a top end of the fourth vertical plate 321 to a direction away from the third transverse plate 31 such that the fourth connecting plate 322 and the third transverse plate 31 are located at two ends of the fourth vertical plate 321 respectively. The extending direction of the fourth connecting plate 322 is opposite to that of the third transverse plate 31. The fourth connecting plate 322, the fourth vertical plate 321 and the third transverse plate 31 form a zigzag-like structure. A hinge relief groove 7 is formed between the fourth connecting plate 322, the fourth vertical plate 321 and the proximal knuckle 2. A fourth hinging hole is formed in the fourth connecting plate 322. The middle knuckle 3 is hinged with the proximal knuckle 2 through the fourth hinging hole. A fourth through hole 3211 is formed in an side of the fourth vertical plate 321 close to the third transverse plate 31. The fourth through hole 3211 is configured for the driving cable 5 to pass through.

Like an action process of the distal knuckle 4, in the initial state, the humanoid finger mechanism is in a straight state under the tension of the tension band 6. When the driving cable 5 applies a tensile force and after the distal knuckle 4 and the middle knuckle 3 are folded, the driving cable 5 continues to overcome the tension applied by the tension band 6 and apply a tensile force pointing to a direction of the proximal knuckle 2 to the fourth vertical plate 321 such that the fourth vertical plate 321 rotates and bends to a direction approaching the proximal knuckle 2 along the hinge point and then the middle knuckle 3 and the proximal knuckle 2 are folded at the hinge relief groove 7 therebetween for grabbing. After grabbing, the driver does not apply any tensile force to the driving cable 5 any longer, and under the action of the tension band 6, the middle knuckle 3 and the proximal knuckle 2 rotate at the hinge point and are separated at the hinge relief groove 7, to recover the initial state.

Like a structure of the middle knuckle 3, the proximal knuckle 2 in the present application includes a second transverse plate 21 located in middle, as well as a second connecting portion 22 and third connecting portion 23 located at two ends of the second transverse plate 21 respectively. The third connecting portion 23 is suitable for being hinged with the fourth connecting portion 32. The proximal knuckle 2 is hinged with the finger seat 1 through the second connecting portion 22. A structure of the second connecting portion 22 is the same as that of the fourth connecting portion 32. A structure of the third connecting portion 23 is the same as that of the fifth connecting portion 33.

A length of the second transverse plate 21 may be the same as or different from that of the third transverse plate 31. In the present application, the length of the second transverse plate 21 is preferably larger than that of the third transverse plate 31. Therefore, during use, different numbers of proximal knuckles 2 and middle knuckles 3 may be selected as needed by the object to be grabbed to adjust the length of the humanoid finger mechanism to extend an application range of the humanoid finger mechanism and improve the universality thereof in use.

Further, in the present application, the structure of the second connecting portion 22 is the same as that of the fourth connecting portion 32, and the structure of the third connecting portion 23 is the same as that of the fifth connecting portion 33. Therefore, connecting structures between each knuckle are universal, and the number of the knuckles may further be selected according to the grabbing need. In addition, a position relationship between the middle knuckle 3 and the proximal knuckle 2 may be adjusted to further extend the application range of the humanoid finger mechanism and improve the universality thereof in use.

Specifically, the second connecting portion 22 in the present application includes a second vertical plate 221 in vertical connection with the second transverse plate 21 and a second connecting plate 222 in vertical connection with the second vertical plate 221. The second connecting plate 222 extends from a top end of the second vertical plate 221 to a direction away from the second transverse plate 21. A second hinging hole adapted to the finger seat 1 is formed in the second connecting plate 222. A second through hole 2211 is formed in an end of the second vertical plate 221 close to the second transverse plate 21. The second through hole 2211 is configured for the driving cable 5 to pass through.

The third connecting portion 23 includes a third vertical plate 231 in vertical connection with the second transverse plate 21 and a third connecting plate 232 in vertical connection with the third vertical plate 231. The third connecting plate 232 extends from a top end of the third vertical plate 231 to the direction away from the second transverse plate 21. A third hinging hole 2321 is formed in the third connecting plate 232. The third hinging hole 2321 is suitable for being matched with the fourth hinging hole so as to hinge the proximal knuckle 2 and the middle knuckle 3. A third through hole 2311 is formed in an end of the third vertical plate 231 close to the second transverse plate 21. The third through hole 2311 is configured for the driving cable 5 to pass through.

The initial state of the humanoid finger mechanism and an action process and principle of each structure in the proximal knuckle 2 during grabbing are similar to those of the middle knuckle 3, and will not be elaborated herein.

Figure 2:
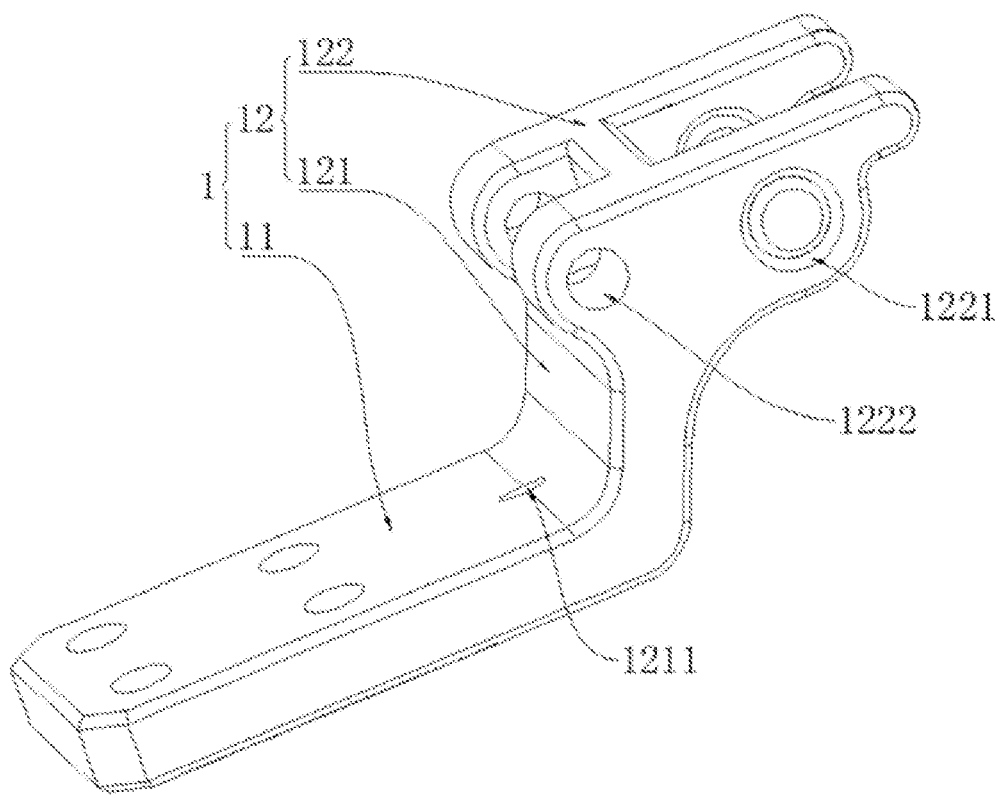
FIG. 2 is a simplified structure diagram of a finger seat according to the present invention.

The finger seat 1 is located at an inner side of each knuckle in the humanoid finger, and is configured to connect each knuckle with a driving structure, etc. As shown in FIG. 2, the finger seat 1 in the present application includes a first transverse plate 11 and a first connecting portion 12 connected to an outer side of the first transverse plate 11. The first transverse plate 11 is located at an inner side of the first connecting portion 12. In the present application, the first transverse plate 11 is preferably of a platy structure. The first transverse plate 11 is configured for connection with the driving structure. The finger seat 1 is connected with the proximal knuckle 2 through the first connecting portion 12. In order to implement the connection with the proximal knuckle 2, the first connecting portion 12 includes a first vertical plate 121 in vertical connection with the first transverse plate 11 and a first connecting plate 122 in vertical connection with the first vertical plate 121. The first connecting plate 122 extends from a top end of the first vertical plate 121 to a direction away from the first transverse plate 11. That is, the first transverse plate 11 and the first connecting plate 122 are located at two ends of the first vertical plate 121 respectively. An extending direction of the first transverse plate 11 is opposite to that of the first connecting plate 122. Therefore, the first transverse plate 11, the first vertical plate 121 and the first connecting plate 122 form a zigzag-like structure. The shape of the first connecting plate 122 is not limited to the platy structure. A first hinging hole 1221 is formed in an end of the first connecting plate 122 away from the first transverse plate 11. The first hinging hole 1221 is suitable for being matched with the second hinging hole so as to hinge the finger seat 1 and the proximal knuckle 2. The first hinging hole 1221 is distributed in a width direction of the humanoid finger such that the proximal knuckle 2 rotates about a pin shaft in the first hinging hole 1221 in a direction from the first connecting plate 122 to the first transverse plate 11 during grabbing. A first tension hole 1222 is formed in an end of the first connecting plate 122 close to the first transverse plate 11. The first tension hole 1222 is configured to fix an end of the tension band 6. A first through hole 1211 is formed in an end of the first vertical plate 121 close to the first transverse plate 11. The first through hole 1211 is adapted to the driving cable 5. The driving cable 5 penetrates through the finger seat 1 through the first through hole 1211.

It can be seen from the above structure descriptions that the first vertical plate 121, the first connecting plate 122, the second connecting plate 222 and the second vertical plate 221 enclose a hinge relief groove 7, the driving cable 5 is located at the end close to the first transverse plate 11, the tension band 6 is located at the end away from the first transverse plate 11, and the driving cable 5 penetrates through the hinge relief groove 7 to be connected with the proximal knuckle 2. A specific grabbing process is similar to the above description, and will not be elaborated herein.

It can be seen from the above analysis that, in the present application, each of the finger seat 1, the proximal knuckle 2, the middle knuckle 3 and the distal knuckle 4 is of an integrated modular structure shaped like a Chinese character "Ao". Multiple spaced groove structures opened in opposite directions are formed through the finger seat 1, the proximal knuckle 2, the middle knuckle 3 and the distal knuckle 4. Folded and separated states at the hinge relief groove 7 between two adjacent knuckles may be controlled under the co-action of the tension band 6 and driving cable 5 distributed in parallel at the upper and lower ends, so as to control grabbing. The structure is simple, the manufacturability is high, cost reduction is facilitated, and meanwhile, the control process is simple and direct.

Further, in order to improve the grabbing effect, the humanoid finger mechanism provided in the present application further includes finger pulp skin 8. The finger pulp skin 8 is sequentially connected with the finger seat 1, the proximal knuckle 2, the middle knuckle 3 and the distal knuckle 4. Specifically, the finger pulp skin 8 is sequentially connected with the first transverse plate 11, the second transverse plate 21, the third transverse plate 31 and the fourth transverse plate 41, and is located at a grabbing side of the humanoid finger mechanism.

In the present application, the finger pulp skin 8 is preferably made of a flexible material with a high friction coefficient, and fits closely with the first transverse plate 11, the second transverse plate 21, the third transverse plate 31 and the fourth transverse plate 41. During grabbing, the finger pulp skin 8 is deformed with the finger seat 1, the proximal knuckle 2, the middle knuckle 3 and the distal knuckle 4, and contacts with the grabbed object so as to improve a clamping force on the object by use of high friction performance thereof.

In the present application, the driver is preferably a tandem elastic driver. Therefore, the clamping force on the object is transmitted to the tandem elastic driver through the driving cable 5 connected with the driver, and the tandem elastic driver further indirectly senses the clamping force on the object and controls the clamping force. The force on the object may be controlled for adaptive grabbing without any fingertip force level sensor.

According to the humanoid finger mechanism provided in the present invention, an integrated design is used for each knuckle module, so that the structure is simplified, and the length of the humanoid finger mechanism may be adjusted according to an object grabbing need to improve the universality in use. The multi-knuckle elastic resetting of the humanoid finger mechanism is implemented through the integrated tension band 6, so that the structure is simple. The tandem elastic driver is matched with the driving cable 5 to drive grabbing, so that the advantages of light weight, flexibility and high impact resistance are achieved.

Although the present disclosure is disclosed above, the scope of protection of the present disclosure is not limited thereto. Those skilled in the art may make various variations and modifications without departing from the spirit and scope of the present disclosure. All these variations and modifications fall within the scope of protection of the present disclosure.

What is claimed is:

1. A humanoid finger mechanism, comprising:
    a finger seat;
    at least one proximal knuckle, located at an outer side of the finger seat;
    at least one middle knuckle, located at an outer side of the at least one proximal knuckle;
    a distal knuckle, located at an outer side of the at least one middle knuckle,
    wherein each of the finger seat, the at least one proximal knuckle, the at least one middle knuckle and the distal knuckle are of an integrated structure, and the finger seat, the at least one proximal knuckle, the at least one middle knuckle and the distal knuckle are sequentially hinged;
    a driver, located at an inner side of the finger seat;
    a driving cable, wherein a first end of the driving cable is connected with the driver, while a second end of the driving cable is connected with the distal knuckle after sequentially penetrating through the finger seat, the at least one proximal knuckle and the at least one middle knuckle; and
    a tension band, wherein a first end of the tension band is connected with the finger seat, while a second end of the tension band is connected with the distal knuckle after sequentially penetrating through the finger seat, the at least one proximal knuckle and the at least one middle knuckle.

2. The humanoid finger mechanism according to claim 1, wherein hinge relief grooves are formed at hinging positions between the finger seat, the at least one proximal knuckle, the at least one middle knuckle and the distal knuckle.

3. The humanoid finger mechanism according to claim 2, wherein
    the distal knuckle comprises a fourth transverse plate and a sixth connecting portion connected with the fourth transverse plate;
    the sixth connecting portion comprises a sixth vertical plate in vertical connection with the fourth transverse plate and a sixth connecting plate in vertical connection with the sixth vertical plate;
    the sixth connecting plate extends from a top end of the sixth vertical plate to a side away from the fourth transverse plate;
    a sixth hinging hole adapted to the at least one middle knuckle is formed in the sixth connecting plate;
    a second tension hole is formed in an end of the sixth connecting plate close to the fourth transverse plate;
    a fixing dowel is arranged at an end of the sixth vertical plate close to the fourth transverse plate; and
    the driving cable is connected with the fixing dowel.

4. The humanoid finger mechanism according to claim 3, wherein
    the at least one middle knuckle comprises a third transverse plate located in a middle, as well as a fourth connecting portion and a fifth connecting portion located at two ends of the third transverse plate respectively;
    the at least one middle knuckle is hinged with the at least one proximal knuckle through the fourth connecting portion; and
    the fifth connecting portion is configured for being matched with the sixth hinging hole to hinge the at least one middle knuckle and the distal knuckle.

5. The humanoid finger mechanism according to claim 4, wherein
    the fifth connecting portion comprises a fifth vertical plate in vertical connection with the third transverse plate and a fifth connecting plate in vertical connection with the fifth vertical plate;
    the fifth connecting plate extends from a top end of the fifth vertical plate to a direction away from the third transverse plate;
    a fifth hinging hole adapted to the sixth hinging hole is formed in the fifth connecting plate; and
    a through hole is formed in an end of the fifth vertical plate close to the third transverse plate.

6. The humanoid finger mechanism according to claim 5, further comprising a finger pulp skin, wherein the finger pulp skin is sequentially connected with the finger seat, the at least one proximal knuckle, the at least one middle knuckle and the distal knuckle.

7. The humanoid finger mechanism according to claim 4, wherein
    the fourth connecting portion comprises a fourth vertical plate in vertical connection with the third transverse plate and a fourth connecting plate in vertical connection with the fourth vertical plate;
    the fourth connecting plate extends from a top end of the fourth vertical plate to a direction away from the third transverse plate;
    a fourth hinging hole is formed in the fourth connecting plate;
    the at least one middle knuckle is hinged with the at least one proximal knuckle through the fourth hinging hole; and
    a through hole is formed in an end of the fourth vertical plate close to the third transverse plate.

8. The humanoid finger mechanism according to claim 7, further comprising a finger pulp skin, wherein the finger pulp skin is sequentially connected with the finger seat, the at least one proximal knuckle, the at least one middle knuckle and the distal knuckle.

9. The humanoid finger mechanism according to claim 4, wherein
    the at least one proximal knuckle comprises a second transverse plate located in the middle, as well as a second connecting portion and a third connecting portion located at two ends of the second transverse plate respectively;
    the third connecting portion is configured for being hinged with the fourth connecting portion;
    the at least one proximal knuckle is hinged with the finger seat through the second connecting portion;
    a structure of the second connecting portion is identical to a structure of the fourth connecting portion; and
    a structure of the third connecting portion is identical to a structure of the fifth connecting portion.

10. The humanoid finger mechanism according to claim 9, wherein
    the finger seat comprises a first transverse plate and a first connecting portion connected to an outer side of the first transverse plate;
    the first connecting portion comprises a first vertical plate in vertical connection with the first transverse plate and a first connecting plate in vertical connection with the first vertical plate;
    the first connecting plate extends from a top end of the first vertical plate to a direction away from the first transverse plate;

a first hinging hole is formed in an end of the first connecting plate away from the first transverse plate;

the first hinging hole is configured for being matched with the second connecting portion to hinge the finger seat and the at least one proximal knuckle;

a first tension hole is formed in an end of the first connecting plate close to the first transverse plate; and a through hole is formed in an end of the first vertical plate close to the first transverse plate.

11. The humanoid finger mechanism according to claim 10, further comprising a finger pulp skin, wherein the finger pulp skin is sequentially connected with the finger seat, the at least one proximal knuckle, the at least one middle knuckle and the distal knuckle.

12. The humanoid finger mechanism according to claim 9, further comprising a finger pulp skin, wherein the finger pulp skin is sequentially connected with the finger seat, the at least one proximal knuckle, the at least one middle knuckle and the distal knuckle.

13. The humanoid finger mechanism according to claim 4, further comprising a finger pulp skin, wherein the finger pulp skin is sequentially connected with the finger seat, the at least one proximal knuckle, the at least one middle knuckle and the distal knuckle.

14. The humanoid finger mechanism according to claim 4, wherein the driver is a tandem elastic driver.

15. The humanoid finger mechanism according to claim 3, further comprising a finger pulp skin, wherein the finger pulp skin is sequentially connected with the finger seat, the at least one proximal knuckle, the at least one middle knuckle and the distal knuckle.

16. The humanoid finger mechanism according to claim 3, wherein the driver is a tandem elastic driver.

17. The humanoid finger mechanism according to claim 2, further comprising a finger pulp skin, wherein the finger pulp skin is sequentially connected with the finger seat, the at least one proximal knuckle, the at least one middle knuckle and the distal knuckle.

18. The humanoid finger mechanism according to claim 2, wherein the driver is a tandem elastic driver.

19. The humanoid finger mechanism according to claim 1, further comprising a finger pulp skin, wherein the finger pulp skin is sequentially connected with the finger seat, the at least one proximal knuckle, the at least one middle knuckle and the distal knuckle.

20. The humanoid finger mechanism according to claim 1, wherein the driver is a tandem elastic driver.

\* \* \* \* \*